United States Patent [19]

Logan

[11] Patent Number: 5,514,280
[45] Date of Patent: May 7, 1996

[54] AQUARIUM FILTER

[76] Inventor: Robert Logan, P.O. Box 169, Towaco, N.J. 07082

[21] Appl. No.: 339,931

[22] Filed: Nov. 15, 1994

[51] Int. Cl.$^6$ .................................. A01K 63/04
[52] U.S. Cl. ................ 210/617; 210/151; 210/169; 119/260; 119/262
[58] Field of Search .................. 210/150, 151, 210/169, 202, 220, 258, 259, 416.2, 615, 617; 119/259, 260, 261, 262

[56]  References Cited

U.S. PATENT DOCUMENTS

| | | | |
|---|---|---|---|
| 3,540,593 | 11/1970 | Stewart | 210/169 |
| 3,768,652 | 10/1973 | Jardim | 210/169 |
| 3,983,843 | 10/1976 | Johnson | 210/169 |
| 4,657,672 | 4/1987 | Allen | 210/416.2 |
| 4,851,112 | 7/1989 | Schlensker | 119/260 |
| 4,915,828 | 4/1990 | Meyers et al. | 210/169 |
| 5,059,315 | 10/1991 | Senape | 210/416.2 |
| 5,108,594 | 4/1992 | Giovanetti et al. | 210/151 |
| 5,171,438 | 12/1992 | Korcz | 210/169 |
| 5,176,824 | 1/1993 | Willinger et al. | 119/260 |
| 5,234,581 | 8/1993 | Rosenberg | 210/169 |
| 5,242,582 | 9/1993 | Marioni | 210/169 |
| 5,306,421 | 4/1994 | Weinstein | 210/416.2 |

*Primary Examiner*—Christopher Upton
*Attorney, Agent, or Firm*—Evelyn M. Sommer

[57]  ABSTRACT

A filter system is provided for mounting on an aquarium tank to treat the water in the aquarium. The filter system comprises a plurality of filter chambers, each containing a different filter media. The filter chambers serve to filter particulate matter from the aquarium water. A heater is further provided for controlling and maintaining the temperature of the aquarium water. The filter system further includes a dry chamber including a biological medium to support the growth of beneficial bacteria on the medium. A particularly preferred type of media is a plurality of plastic biospheres. The beneficial bacteria serve to biologically treat the aquarium and eliminate ammonia and nitrites from the water. At least one buffering chamber including a buffering medium is provided for buffering the aquarium water and maintaining a predetermined alkalinity level for the water. An air pump serves to pressurize portions of said filter system and aerate the aquarium water.

16 Claims, 2 Drawing Sheets

AQUARIUM FILTER

BACKGROUND OF THE INVENTION

1. Field of the Invention

The present invention relates generally to an aquarium filter and, more particularly, to an aquarium filter that is adapted to be easily mounted on the rear wall of the aquarium and which is a true wet/dry filter that filters, aerates, heats and buffers the water.

2. Description of the Prior Art

Filters have been used in aquariums for many years to remove particulate matter from the aquarium water in order to keep the aquarium clean. Traditionally, the most common type of aquarium filter is a power filter which hangs on the outside of the aquarium over the top edge thereof. It includes a siphon tube which carries water from the aquarium into the filter box which is located on the outside of the tank. Water entering the filter box flows over various types of filter media to remove particulate matter from the water. The water passes through filter carbon to remove chemicals impurities from the water which is then pumped back into the aquarium using a filter pump. Examples of such power filters include the Supreme Aqua King power filter marketed by E. G. Danner Manufacturing Co.; the Second Nature Whisper power filter marketed by Willinger Bros. Mfg. Co.; and the Aqua Clear power filter marketed by Rolf Hagen Manufacturing Co.

Another type of aquarium filter hereto used is a canister type filter which is posited outside and below the aquarium. Intake and output hoses hang over the aquarium edge and are connected to the canister filter on the floor. Water is fed by gravity through the intake hose from the aquarium to the canister. The aquarium water is both mechanically and chemically treated and pumped back into the aquarium by a pump contained in the canister. Examples of canister type filters include the Hagen Fluval filter marketed by Hagen USA Mfg., Co.; and Marine Land canister filter marketed by Aquaria, Inc.

An internally mounted power filter is still another type of aquarium filter. Such a filter comprise a small canister with a built-in pump which is submerged inside the aquarium. Water enters the bottom of the canister and flows through a filter sleeve which removes particulate and chemical waste. The filtered water is then pumped out the top of the canister and back into the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2". Air lines from an external pump are placed in the riser tubes to the bottom plate and an air stone is placed at the end of the air lines. Air is forced by the pump to the air stones thereby forcing air bubbles to travel up through the tubes to the water surface creating turbulence or current. Water is then pulled through the gravel and forced up the riser tubes. Waste from the aquarium is drawn through the gravel bed where bacteria breaks down any ammonia or nitrites to less harmful nitrates. A biological filter does not, however, remove chemical wastes. Examples of such undergravel filters include filters marketed by Perfecto Mfg. and Penplex Mfg.

Yet another type of prior art filter commonly used in aquariums is a wet/dry trickle type filter which includes a skimmer box that hangs inside the aquarium at the top. Siphon tubes are provided for carrying water from the aquarium to a prefilter which is mounted directly behind the skimmer box on the outside of the aquarium. Water passes through foam sleeves in a pre-filter to trap particulate matter. The water then travels through the hose in a tank typically positioned beneath the aquarium. As water enters the tank beneath the aquarium, it flows onto a drip plate or spray bar in a dry chamber of filters which contains a plurality of plastic biospheres. Water drips over and through the biospheres to the bottom section of the tank. Bacteria colonies grow on all biospheres which feed on waste products in the water passing over them. From there, the water gathers in the bottom of the filter tank and then passes through a carbon filter or other filter to remove chemical wastes from the water. The water is then passed through dolomite, crushed coral or crushed clam shells to buffer the water which is then pumped through the return hose back to the aquarium. Wet/dry filters can include mechanical, chemical and biological filters. Examples of such filters in the Plus Series trickle filter marketed by Oceanic System, Inc. and the Perfecto Wet/Dry filtration system sold by Perfecto Mfg. Co.

Wet/dry filters may also be built into the aquarium and form a permanent part of the tank. One such wet/dry filter that is permanently built into the tank is marketed by Tenecor Corporation of Tempe, Ariz.

An alternative form of the wet/dry filter is an internally mounted wet/dry filter which includes an integrated pump and heater for small aquariums. The filter is placed inside the aquarium against the rear wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area. One such filter is marketed by Rolf Hagen Mfg. under the trademark "Biolife" filter.

With the exception of the wet/dry filters, none of the filters heretofore marketed treat the water mechanically, chemically and biologically nor do they buffer the pH of the water to the proper levels for marine inhabitation. While the wet/dry filters described above accomplish some of these objectives, they are complicated to install, are expensive and have involved maintenance requirements. Moreover, they are prone leakage since the water is removed and then pumped back through the hoses.

Permanently mounted wet/dry filters such as the filter system marketed by Tenecor Corporation are extremely efficient although they require the purchase of the entire system including the tank and stand.

Moreover, the internally mounted filters are only for aquariums up to 55 gallons in capacity. They do not buffer or completely filter all of the water entering the biological section. The filter cartridges quickly clog requiring frequent maintenance of the wet areas of the filter. The biological area uses ceramic blocks for bacteria beds which tend to clog and must be replaced. Moreover, since the water entering the filter comes from the bottom of the filter, they do not skim the surface of the water.

As will be appreciated, none of these prior patents even address the problem faced by applicant let alone offer the solution proposed herein.

SUMMARY OF THE INVENTION

Against the foregoing background, it is a primary object of the present invention to provide an aquarium filter that is capable of filtering, aerating, heating and buffering the water.

It is another object of the present invention to provide such an aquarium filter that is complete and does not require the incorporation of additional filtering elements.

It is yet another object of the present invention to provide such an aquarium filter that is adapted to mount on the inside of the aquarium.

It is still yet another object of the present invention to provide such an aquarium filter that does not require an expensive and complicated installation.

It is yet still another object of the present invention to provide such an aquarium filter that is portable and may be moved from aquarium to aquarium.

It is but another object of the present invention to provide such an aquarium filter that is able to filter, aerate, heat and buffer the aquarium water.

To the accomplishments of the foregoing objects and advantages, the present invention, in brief summary, comprises A filter system that can be mounted in an aquarium tank to treat the aquarium water. The filter system comprises a plurality of filter chambers each containing a different filter media for filtering particulate matter from the aquarium water. A heater is further provided for controlling and maintaining the temperature of the aquarium water. The filter system further includes a dry chamber including a biological medium to support the growth of beneficial bacteria on the medium. A particularly preferred type of media is a plurality of plastic biospheres. The beneficial bacteria serve to biologically treat the aquarium and eliminate ammonia and nitrites from the water. The system further includes at least one buffering chamber including a buffering medium which is adapted to maintain a predetermined alkalinity level for the aquarium water. An air pump is used pressurize portions of the filter system and aerate the aquarium water.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figure 1:
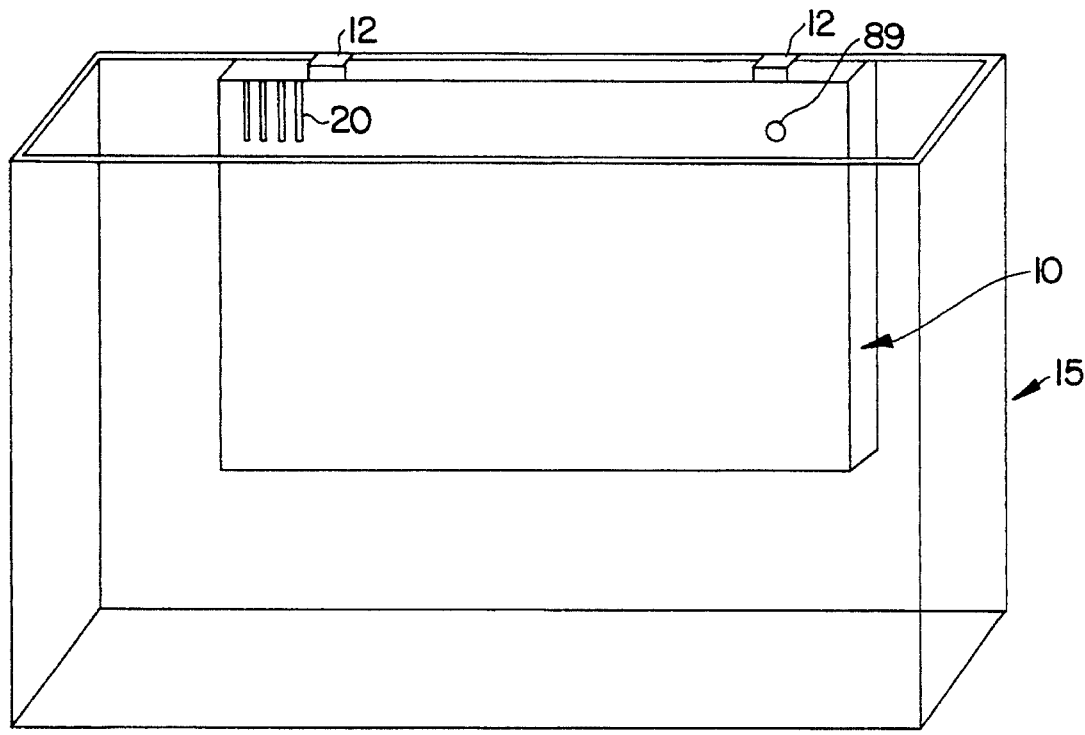
FIG. 1 is a perspective view illustrating the mounting of the aquarium filter of the present invention in an aquarium tank.
Figure 2:
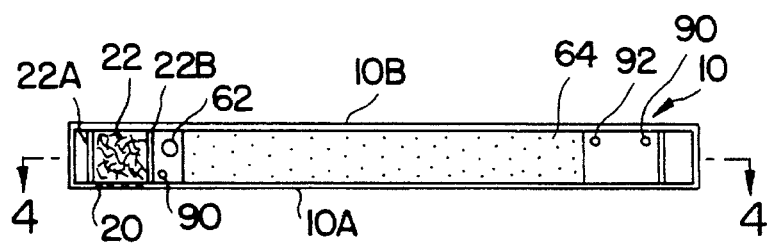
FIG. 2 is a top elevational view of the aquarium filter of the present invention.
Figure 3:
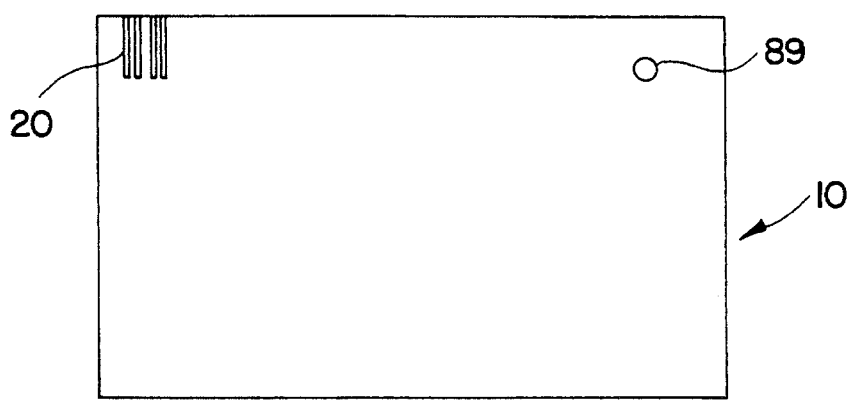
FIG. 3 is a front elevational view of the aquarium filter of the present invention.
Figure 4:
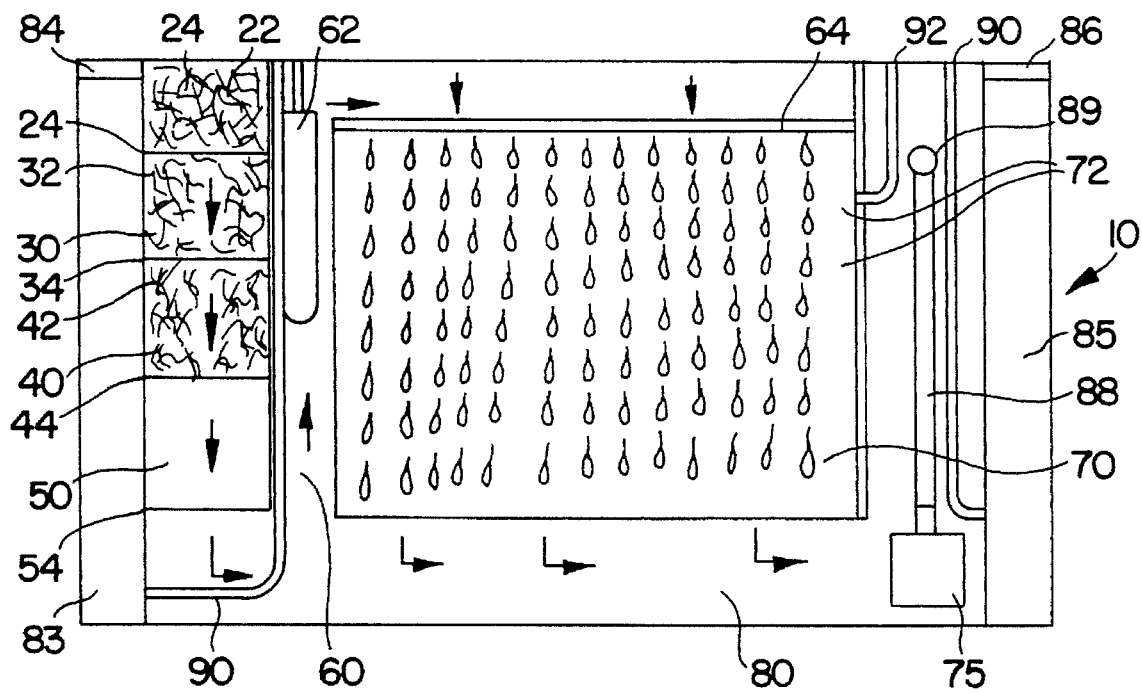
FIG. 4 is a section from elevational view taken along line 4—4 of FIG. 2.
Figure 5:
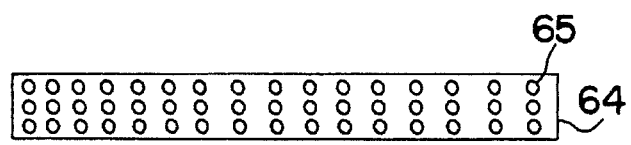
FIG. 5 is a top view of the drip plate over the dry chamber within the aquarium filter of the present invention.

Referring to the drawings and, in particular, to FIG. 1, the aquarium filter of the present invention 10 is shown mounted on the back wall of an aquarium 15. Filter 10 is secured to the back wall of the aquarium by one or more clamps 12. As will be appreciated, filter 10 may be easily secured to and removed from the aquarium tank 15 due to the use of these releasable clamps 12.

The filter 10 is adapted to treat the aquarium water to keep it clean and, in particular, to filter, aerate, heat and buffer such water. The filter 10 includes a plurality of chambers and divisions each of which serve a particular function in the filtering process. The aquarium water to be treated by the filter 10 is introduced into the filter 10 through a plurality of slots 20 provided at the top of the filter 10 which communicate with a first filter chamber 22 provided in the filter 10. First filter chamber 22 is defined by the front and back walls of the filter 10A and 10B, respectively, and first filter chamber side walls 22A and 22B, respectively. A filter media comprised of polyester fiber 24 is provided in the first filter chamber 22.

The water is moves sequentially in a downward direction through a second filter chamber 30, a third filter chamber 40 and a finally fourth filter chamber 50. Second filter chamber 30 contains an activated carbon filter material 32. Third and fourth filter chambers 40 and 50 contain a resinous filter media 42, 52, respectively. The filter chambers 20–50 are separated from each other by perforated drip plates 24, 34, and 44 which permit the water to pass through the perforations but retain the filter media. Passing the aquarium water through filter chambers 20–50 serves to remove any harmful chemicals and particulate matter from the aquarium water.

When the aquarium water passes from the fourth filter chamber 50, it passes through a heat chamber 60 containing a heater 62 where the filtered water is heated to the desired water temperature, if necessary. The purpose of heat chamber 60 is to maintain the temperature of the aquarium water to a predetermined setting.

After reaching the top of the heat chamber 60, the water then flows over a drip plate 64 positioned above a dry chamber 70 within the filter 10. The drip plate contains a plurality of holes or apertures 65, preferably about 3/32" in diameter, which permit the water to pass through the drip plate and enter the dry chamber 70 which is filled with a plurality biospheres 72. It has been found that biospheres are a perfect medium for culturing a population of beneficial bacteria. The beneficial bacteria attach themselves to the multiple projectiles on all the biospheres and feed on the waste in the aquarium water as it drips through the dry chamber 70 through the biospheres 72. Ammonia and nitrites contained in the aquarium water are removed as the water passes by gravity through the biospheres 72 contained in the dry chamber 70.

The biospheres provide a large surface area for the beneficial bacteria to grow on and are homosites for the bacteria. It should be appreciated that any inert plastic of virtually any shape can be used for this purpose. For example, small round balls called bioballs may also be used. Alternative media include plastic shavings, plastic mesh, plastic chips, etc. Biospheres are, however, preferred and most preferably in an amount of at least 160 per filter.

With a layer of aquarium water above the drip plate 64 and water below the dry chamber 70, air entering the dry chamber 70 through an air pump 75 pressurizes the dry chamber 70, thus supersaturating the water with oxygen and creating an ideal atmosphere for bacterial growth. After the water passes through the biospheres 72 contained within the dry chamber, it collects on the bottom chamber 80 of the filter 10 where it is pumped back into the aquarium.

A pair of buffering side chamber 83 and 85 are provided at opposite sides of the filter 10. Buffering side chambers are filled with dolomite (crushed limestone). Water may enter these buffering chambers 83,85 through perforations 84 and 86 provided at opposite ends of the filter 10 near the top. Air is injected into the bottom portion of each buffering chamber 83,85 from the air pump 75 through tubing 90 so as to cause a continuous flow of aquarium water through the buffering chamber 83,85.

Passing the aquarium water through these buffering chamber 83,85 serves to maintain an alkaline pH (i.e., about 8.3) for the water which is necessary for marine aquariums. Crushed coral or crushed clam shells can also be used for this purpose.

The only maintenance required is in the wet filtering areas where the polyester fiber and carbon resins must periodically be changed. No maintenance is needed in the dry chamber 70.

Having thus described the invention with particular reference to the preferred forms thereof, it will be obvious that various changes and modifications can be made therein without departing from the spirit and scope of the present invention as defined by the appended claims.

Wherefore, I claim:

1. An in-the-tank aquarium tank filter system for treating water in said aquarium, said filter system comprising:
   a housing with releasable mountings containing:
   a plurality of filter chambers each containing filter media and effective to filter particulate matter from said aquarium water;
   a heater effective to maintain the temperature of said aquarium water;
   a dry chamber including a biological medium to support the growth of bacteria thereon and effective to biologically treat said aquarium water;
   at least one buffering chamber including a buffering medium effective to buffer said aquarium water; and
   an air pump in communication with said dry chamber, said air pump being effective to pressurize said dry chamber.

2. The filter system of claim 1, wherein said system includes at least three filter chambers.

3. The filter system of claim 1, wherein the first of said filter chambers includes polyester fiber as a filtering medium.

4. The filter system of claim 2, wherein the second of said filter chambers includes activated carbon as a filtering medium.

5. The filter system of claim 2, where in the third of said filter chambers includes a filter resin as a filtering medium.

6. The filter system of claim 1, wherein said dry chamber includes a plurality of plastic biospheres as the biological medium for beneficial bacteria.

7. The filter system of claim 6, wherein said dry chamber is adapted to remove ammonia and nitrites from said aquarium water.

8. The filter system of claim 1, wherein said at least one buffering chamber includes a buffering medium selected from the group consisting of dolomite, crushed coral and crushed clam shells.

9. The filter system of claim 8, wherein the buffering medium is dolomite.

10. The filter system of claim 1, wherein at least two buffering chambers are provided.

11. An aquarium including a filter system effective to treat water in said aquarium, said filter system including:
    a plurality of filter chambers each containing filter media and effective to reduce the concentration of particulate matter in said aquarium water;
    a heater for controlling the temperature of said aquarium water;
    a dry chamber including a biological medium to support the growth of bacteria thereon and effective to biologically treat said aquarium water;
    at least one buffering chamber including a buffering medium effective to buffer said aquarium water; and
    an air pump in communication with said dry chamber, said air pump effective to pressurize said dry chamber.

12. The filter system of claim 11, wherein said filter system includes at least three filter chambers, the first of which includes polyester fiber as a filtering medium.

13. The filter system of claim 12, wherein the second of said filter chambers includes activated carbon as a filtering medium and the third of said filter chambers includes a filter resin as a filtering medium.

14. The filter system of claim 11, wherein said dry chamber includes a plurality of plastic biospheres as the biological medium for beneficial bacteria and is adapted to remove ammonia and nitrites from said aquarium water.

15. The filter system of claim 11, wherein said at least one buffering chamber includes a buffering medium selected from the group consisting of dolomite, crushed coral and crushed clam shells.

16. A process for treating aquarium water contained in an aquarium using a filter system mounted in said aquarium, said process comprising the steps of:
    introducing said aquarium water into said filter system;
    filtering said aquarium water in a plurality of filter compartments;
    maintaining the temperature of said aquarium water at a predetermined temperature;
    biologically treating said aquarium water with beneficial bacteria included in a dry chamber filter compartment;
    buffering said aquarium water so as to maintain the pH of the water at a predetermined alkalinity level; and
    using air to pressurize said dry chamber filter compartment.

* * * * *